(12) United States Patent
Oepping (10) Patent No.: US 12,373,819 B2
(45) Date of Patent: *Jul. 29, 2025

(54) SYSTEM AND METHOD FOR PROCESSING CHIP-CARD TRANSACTIONS FROM A HOST COMPUTER

(71) Applicant: Convenient Payments, LLC, Draper, UT (US)

(72) Inventor: Allan Edward Oepping, Draper, UT (US)

(73) Assignee: Convenient Payments, LLC, Draper, UT (US)

( * ) Notice: Subject to any disclaimer, the term of this patent is extended or adjusted under 35 U.S.C. 154(b) by 261 days.

This patent is subject to a terminal disclaimer.

(21) Appl. No.: 17/822,991

(22) Filed: Aug. 29, 2022

(65) Prior Publication Data

US 2023/0065485 A1   Mar. 2, 2023

Related U.S. Application Data

(63) Continuation of application No. 16/409,359, filed on May 10, 2019, now Pat. No. 11,429,952.

(Continued)

(51) Int. Cl.
*G06Q 20/34* (2012.01)
*G06K 7/10* (2006.01)
(Continued)

(52) U.S. Cl.
CPC ....... *G06Q 20/341* (2013.01); *G06K 7/10297* (2013.01); *G06Q 20/02* (2013.01);
(Continued)

(58) Field of Classification Search
CPC ............... G06K 7/00–1495; G06Q 20/00–425
See application file for complete search history.

(56) References Cited

U.S. PATENT DOCUMENTS 8,560,448 B2    10/2013  Nonni et al.
10,210,505 B2    2/2019  Zarakas et al.
(Continued)

OTHER PUBLICATIONS

Rachel Abrams, Chip Cards Will Require Users to Dip Rather Than Swipe, Sep. 28, 2015, New York Times, 2 pages (Year: 2015).
(Continued)

*Primary Examiner* — Mohammad A. Nilforoush
(74) *Attorney, Agent, or Firm* — TECHLAW VENTURES, PLLC; Terrence J. Edwards (57) ABSTRACT

A system, method and computer-readable medium for interfacing with an EMV compliant chip card having an embedded microchip. A transaction computer includes a virtual credit card terminal running in a web browser and that is in communication with an EMV card reader having a chip card slot. The virtual terminal defines a first EMV transaction and a second EMV transaction based upon user input. The virtual terminal then causes the embedded microchip of the EMV chip card to generate a first cryptogram associated with the first transaction and a second cryptogram associated with the second transaction during a contact interface session or a contactless interface session. The virtual terminal then authenticates the first and second cryptograms over a computer network with a card issuer. Once authenticated, the virtual terminal completes the first transaction and the second transaction.

20 Claims, 8 Drawing Sheets

Related U.S. Application Data

(60) Provisional application No. 62/814,221, filed on Mar. 5, 2019.

(51) Int. Cl.
  *G06Q 20/02* (2012.01)
  *G06Q 20/38* (2012.01)
  *H04L 9/32* (2006.01)

(52) U.S. Cl.
  CPC ....... *G06Q 20/3821* (2013.01); *H04L 9/3234* (2013.01); *G06Q 2220/00* (2013.01); *H04L 2209/56* (2013.01)

(56) References Cited

U.S. PATENT DOCUMENTS

| | | |
|---|---|---|
| 11,429,952 B2 | 8/2022 | Oepping |
| 2014/0372320 A1 | 12/2014 | Goldfarb et al. |
| 2015/0006407 A1 | 1/2015 | Lunn et al. |
| 2015/0193757 A1 | 7/2015 | Luongo et al. |
| 2017/0200149 A1 | 7/2017 | Antunovic et al. |
| 2019/0034910 A1 | 1/2019 | Gardner et al. |

OTHER PUBLICATIONS

Jeannette N. Bennett, The Smart-Chip Credit Card: A Current Solution, Mar. 2016, Economic Research, Federal Reserve Bank of St. Louis, 4 pages (Year: 2016).

Hewlett Packard Point of Sale (POS) Peripherals Configuration Guide—Barcode Scanner, Jul. 2009, Document Version 2.10, 20 pages (Year: 2009).

SYSTEM AND METHOD FOR PROCESSING CHIP-CARD TRANSACTIONS FROM A HOST COMPUTER

CROSS-REFERENCE TO RELATED APPLICATIONS

This application is a continuation of U.S. patent application Ser. No. 16/409,359, filed May 10, 2019 (now U.S. Pat. No. 11,429,952), which claims the benefit of U.S. Provisional Application No. 62/814,221, filed Mar. 5, 2019, which are incorporated herein by reference in its entirety, including but not limited to those portions that specifically appear hereinafter, the incorporation by reference being made with the following exception: In the event that any portion of the above-referenced applications are inconsistent with this application, this application supersedes said above-referenced application.

BACKGROUND

1. Technical Field

This disclosure relates generally to systems and methods for processing chip-card transactions from a host computer using a chip card reader.

2. Description of the Related Art

Until recently, credit and debit card transactions typically involved swiping a magnetic strip on the back of the card through a slot of a magnetic card reader. The magnetic card reader would read data encoded in the magnetic strip and then provide the "swipe data" to the magnetic card reader. The magnetic card reader would then send the data over a data network to a card issuer for verification and authorization. If approved, the card reader completed the transaction using the swipe data.

In the wake of numerous large-scale data breaches and increasing rates of counterfeit card fraud, card issuers have recently migrated to a standard known as EMV, which stands for Europay, Mastercard and Visa, to protect consumers and reduce instances of fraud. The EMV standard is a global standard for credit and debit cards equipped with embedded microchips ("chip cards") and sophisticated technology used to authenticate card-based transactions.

Chip cards are read in different ways than from cards with magnetic stripes. For example, instead of swiping the card, a card holder may insert the chip card into a slot of a chip card reader and wait for it to process. When a chip card is inserted into the slot, a process referred to as "dipping," electrical contacts on the card reader come into contact with electrical pads on the chip card to form a wired or contact interface. In another example, a card holder may place the chip card in proximity to the card reader to allow data to flow between the chip card and the card reader over a wireless or contactless interface. Using either a contact or contactless interface, data flows between the chip card and the card issuer to verify the card's legitimacy and create the unique transaction data.

Every time a chip card is used for payment, the chip card's embedded microchip creates a unique one-time transaction code that cannot be used again. The one-time code for each transaction may be a cryptogram (a cryptogram is a short piece of text that is encrypted by an algorithm). The cryptogram generated by the chip card is sent to the card issuer who then deciphers the cryptogram to authorize and authenticate the chip card. The card issuer then sends a second cryptogram back to the card reader to give approval or denial for the transaction. Importantly, since the cryptograms are one-time use only, if a hacker tries to use information stolen from a previous transaction, the hacker's fraudulent transaction would be denied.

Increasingly, chip card transactions are processed through a virtual terminal running on a processor-based computing device, such as a desktop computer, laptop computer, tablet computer, smart phone or Internet-enabled device, and hereinafter referred to herein as a "transaction computer." Virtual terminals may include a web-based application that allows a merchant to accept payment through chip cards using a web browser running on the transaction computer. (A web-based application is any program that is accessed over a network connection, rather than existing within a device's memory. Web-based applications often run inside a web browser.)

Virtual terminals may be provided from computer servers of card processors over the Internet. That is, merchants may subscribe with a card processing service offered by a card processor. As part of the service, merchants are provided access through a merchant account to a virtual terminal that allows them to accept chip card transactions. Virtual terminals allow merchants to enter in the details of chip card transactions, including the transaction amount, through a user interface generated on a display of the transaction computer by a web browser.

Connected to the transaction computer is a card reader that retrieves the card data, including the cryptogram, and provides the data to the virtual terminal. The virtual terminal then sends the chip card data to the card issuer for authentication and approval over a network, such as the Internet. If the card issuer authenticates the cryptogram, the card issuer sends an approval to the virtual terminal to complete the transaction.

In the past, card readers used with transactions processed through web-based virtual terminals connected to the transaction computers through USB ports. However, in order to easily input data directly into the virtual terminals, the card readers were configured to emulate a computer keyboard. That is, the card readers tricked the transaction computers into thinking that the card reader was a keyboard in a process known as keyboard emulation.

While the use of keyboard emulation for card readers is useful for some card transactions processed through virtual terminals, it is prohibitive for other types of desired transactions. For example, card readers that use keyboard emulation are unable to process multiple transactions using a single insertion of the chip card in the slot of the card reader or a single tap. That is, because of the use of keyboard emulation, running multiple transactions on a single insertion is not known to be possible. In order to process multiple transactions for a card reader using keyboard emulation, the chip card must be inserted and removed into the slot of the chip card reader once for each transaction. The need to insert and remove the chip card once for each transaction in a multi-transaction is prone to error, time consuming, and annoying to card holders and merchants.

Another drawback to the use of keyboard emulation during a chip card transaction between a virtual terminal and a card reader is an increased security risk. In particular, when using keyboard emulation, third-party software such as WebRoot or other privacy software may steal the chip card data as it is transmitted from the card reader to the virtual terminal.

Further, with keyboard emulation, keyboard focus is required in the acceptance window to complete a transaction. If the keyboard focus is changed before or during the read, the returned data will be entered, incorrectly, into the window or field in focus.

EMV chip readers integrate with such terminals over an emulated keyboard interface. Upon insert of a card, a Quick Chip transaction is run, and the corresponding data is "typed" over this interface to a virtual terminal on a transaction computer. The virtual terminal captures this data the same way it would capture data typed from the keyboard. Therefore, a virtual terminal has no way to indicate to such a device to have it run a second transaction, or to change the parameters of the transaction.

In short, previously available virtual terminals and card readers are unable to process multiple transactions using a single insertion or a single swipe of a chip card or a single tap. There exists a need for this capability in the marketplace. For example, some entities that accept payment by chip card charge an additional service fee to cover the transaction fees associated with chip card transactions. (These fees are charged by the credit card processor and card issuer). In the past, these entities used two separate card transactions, one for the exact payment amount and the other to cover the transaction fees charged by the card processor. However, due to the past limitations explained above, the card holder was required to insert or swipe the chip card twice—once for each transaction. This often results in longer checkout times as well as confusion on the part of the card holder.

It would therefore be an improvement in the art to provide an EMV chip card processing system that is able to process multiple transactions with a single insertion, a single tap, or a single swipe, of a card in a card reader.

SUMMARY

Disclosed herein is computer-based system to allow more direct communications between card readers and online credit card processing applications, e.g., virtual terminals, running in Internet browsers to allow for multiple credit card transactions to be performed on a single card insert into a chip card slot of a card reader, a single tap of the chip card, or a single swipe of the chip card.

Further disclosed herein is a solution that greatly streamlines the "service fee" or "convenience fee" payment model because it requires two separate transactions to be processed. The present disclosure is capable of generating the required two transactions via a single chip card insertion, a single tap, or a single swipe, and is fully integratable with chip card readers and swipe readers.

Further disclosed herein is connection and interface to allow more direct access to EMV hardware from Internet browser programs running on a transaction computer to allow for multiple transactions to be performed on a single insert of a chip card into a chip card slot of a card reader or a single tap of the chip card.

Further disclosed herein is connection and interface to allow more direct access to EMV hardware from Internet browser programs running on a transaction computer to allow for multiple transactions to be performed during a persistent interface session between a chip card and a card reader, where the persistent interface session comprises either a contact interface or a contactless interface.

Further disclosed herein is a connection and interface between a transaction computer and a chip card that alleviates issues with data corruption due to simultaneous keyboard input, focus changes, or software interference.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
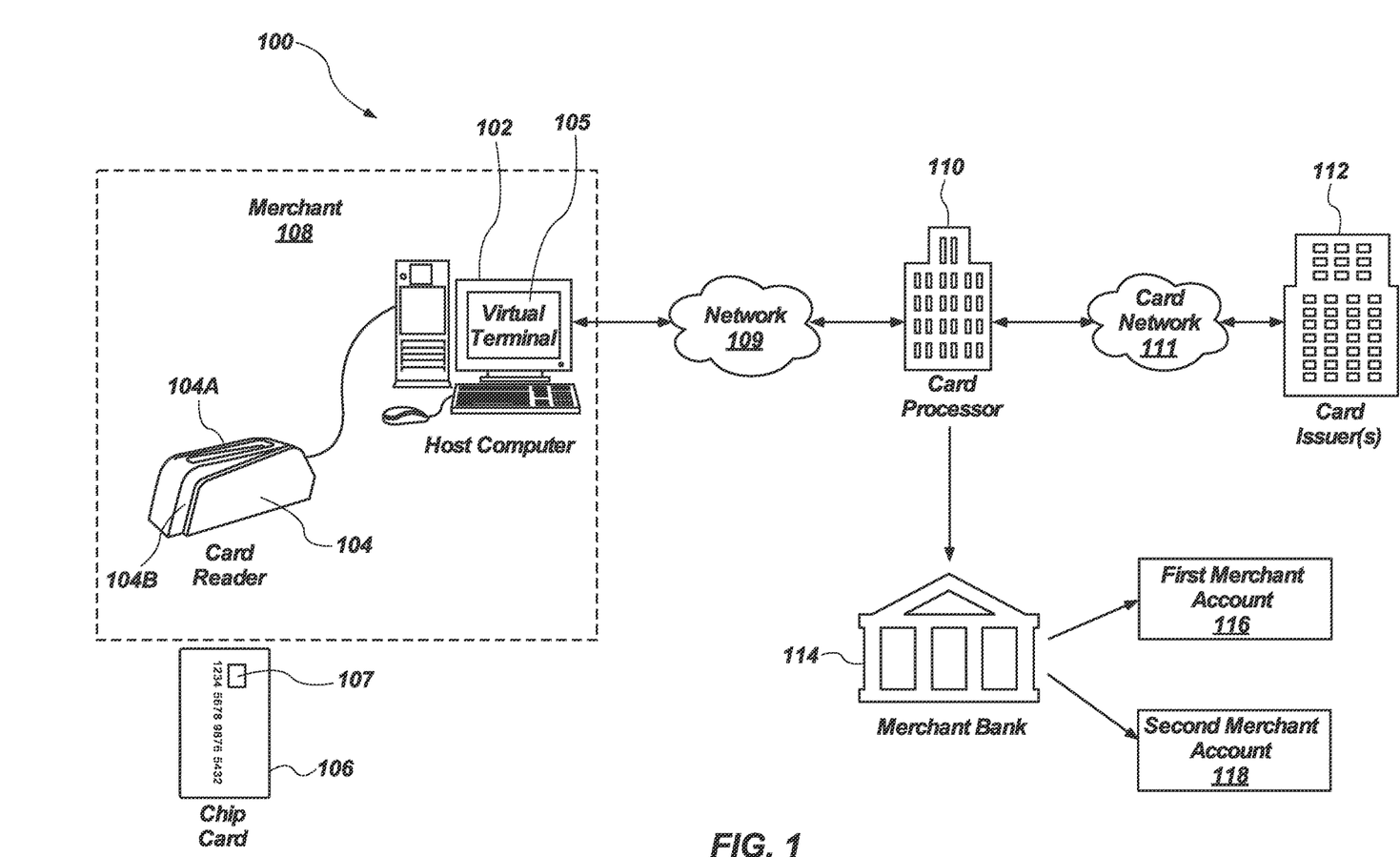
FIG. 1 is a diagram of an exemplary environment for generating the required two transactions via a single insertion of a chip card into a slot of a card reader according to an embodiment of the present disclosure.

Referring to FIG. 1, there is depicted a system 100 for processing two transactions with a single insert, tap or swipe of a payment card according to an embodiment of the present disclosure. The system 100 includes a transaction computer 102 connected to a card reader 104 by a connection, such as a wired or wireless connection. The transaction computer 102 and the card reader 104 may be connected by a USB connection. In an embodiment, the transaction computer 102 and the card reader 104 may be integrated into a single device, such as a dedicated point of sale terminal. In an embodiment, the transaction computer 102 may be one of a tablet computer, a laptop computer, a desktop computer, a point-of-sale register, a smart device, an electronic Internet-enabled device, and a smart phone.

The card reader 104 may be an EMV card reader, i.e., a card reader that is able to interact with chip cards compliant with the EMV standard. The card reader 104 may include a slot 104A for receiving a chip card 106 for "contact" payments. That is, the slot 104A may include electrical contacts for energizing and communicating with the chip card 106. In addition, the card reader 104 may include a magnetic stripe reader 104B in order to read a magnetic stripe (not visible) on the chip card 106. In addition, the card reader 104 may include an antenna for near field communications to enable "tap and pay," sometimes referred to as "tap to pay" or contactless payments with the chip card 106. The card reader 104 may include a keypad that permits card holders to type information, such as a PIN.

As is known to one of ordinary skill, the chip card 106 may include an embedded microchip as well as a traditional magnetic stripe. The chip card 106 may further include electrical contact pads for making physical contact with the electrical contacts of the card reader 104 and for providing power to energize the embedded microchip and for exchanging data with the card reader 104. In addition, the chip card 106 may include a near-field communication (NFC) chip, which can transmit information wirelessly to allow for "tap and pay" payments. The chip card 106 may be compliant with the EMV standard such that the chip card 106 is an EMV chip card having a dual interface, one for a contact interface and one for a contactless interface.

As used herein, the phrase "establishing an interface session" refers to establishing either a contact interface or a contactless interface between the card reader 104 and the chip card 106. In the case of a contact interface, the card reader 104 and the chip card 106 are electrically connected through a physical connection that establishes an electrical link between the card reader 104 and the chip card 106 for communications. In the case of a contactless interface, the card reader 104 and the chip card 106 communicate wirelessly through the air. Further, if the interface is uninterrupted during the session, then it is referred to herein as a "persistent interface session."

The transaction computer 102 and the card reader 104 may be operated by a merchant 108 or some other entity that accepts card payments for goods, fees, taxes, and services. These other entities may include utility companies, governmental agencies, and the like. Thus, it will be understood that, as used herein, the term "merchant" refers to any entity, whether private or government, that accepts card payments of any kind by chip card, credit card, or debit card.

The merchant 108 may enter into a card processing agreement with a card processor 110. In return for a fee, typically a per transaction swipe fee plus a percentage of the transaction amount, the card processor 110 may handle the details of processing the card payments accepted by the merchant 108. The percentage charged by the card processor 110 may range anywhere from 1% to 5%. Swipe fees may range from $0.10 to $1.00. The percentage fee, the swipe fee, and other processing fees not specifically discussed herein are referred to herein as "transaction fees." The card processor 110 may share a portion of the transaction fees with a card issuer 112 as well as a card association (Visa, Mastercard, Discover, American Express, etc.). The card issuer 112 is typically the financial entity that issues the chip card 106 to the card holder.

As part of the its services, the card processor 110 may communicate with the card issuer 112 of the chip card 106 to authorize transactions via a card network 111 on behalf of the merchant 108. The card processor 110 may also settle transactions with a merchant bank 114. That is, the card processor 110 may deposit funds received from the card issuer 112 into a first merchant account 116 and a second merchant account 118 of the merchant bank 114. That is, the funds for the first transaction are deposited into a first merchant account 116 and the funds for the second transaction are deposited into the second merchant account 118.

In order to process multiple transactions via a single insert, tap or swipe, a web browser of the transaction computer 102 is directed to an online site that has a virtual terminal 105 provided by the card processor 110 over a network 109. The merchant 108 may be required to enter login credentials, such as a user name and password, in order to access the features of the virtual terminal 105.

The virtual terminal 105 allows the merchant 108 to input the details of a first transaction, including a first transaction amount. The virtual terminal 105 may then automatically calculate the details of a second transaction, including a second transaction amount. In an embodiment, the second transaction amount may be equal to the transaction fees charged to the merchant 108 for the first transaction plus the transaction fees for the second transaction. For example, the second transaction amount may be a percentage of the first transaction amount or a fixed fee or a combination of both. Alternatively, the merchant 108 may manually define the details for the second transaction, including the second transaction amount.

Once the details of the first transaction and the second transaction have been determined by the virtual terminal 105 on the transaction computer 102, the card holder is prompted to insert, tap or swipe the chip card 106 at the card reader 104. In the case of the chip card 106 being inserted into the slot 104A of the card reader 104, the electrical pads of the chip card 106 make physical contact with the electrical contacts of the card reader 104 to establish a contact interface. Next, the virtual terminal 105 will cause the card reader 104 to generate and return a first one-time code and a second one-time code from the embedded microchip of the chip card 106 during a single insert.

As used herein, the term "contact interface" means that the chip card 106 is not removed from the slot of the card reader 104 during the generation of the first one-time code and the second one-time code. The first one-time code and the second one-time code may be cryptograms generated by an embedded microchip 107 on the chip card 106 pursuant to the EMV standard. The first one-time code is associated with the first transaction and the second one-time code is associated with the second transaction.

In the case of a "tap and pay" transaction, a user taps or holds the chip card 106 in proximity to the card reader 104. The card reader 104 may establish a contactless interface between it and the chip card 106. Next, the virtual terminal 105 will cause the card reader 104 to generate and return a first one-time code and a second one-time code from the embedded microchip of the chip card 106 during the contactless interface.

Once generated, the virtual terminal 105 receives the first one-time code and the second one-time code from the card reader 104. The virtual terminal 105 will then transmit the first one-time code and the second one-time code to the card processor 110 over the network 109. The card processor 110 will then transmit the first one-time code and the second one-time code to the card issuer 112 over the card network 111. If valid, the card issuer 112 will then authenticate the first one-time code and the second one-time code and return a first authorization for the first transaction and a second authorization for the second transaction. It will be appreciated that the first authorization and the second authorization may be cryptograms generated by the card issuer 112. Once the virtual terminal 105 receives the authorizations, the first transaction and the second transaction are completed as two separate transactions. Once the first transaction and the second transaction are completed, the card holder may be prompted to remove the chip card 106 from the card reader 104.

In the case of a swipe of the magnetic stripe on the chip card 106 through the magnetic stripe reader 104B, the virtual terminal 105 will obtain authorization for the first transaction and the second transaction by sending the captured swipe data to the card processor 110 over the network 109. In turn, the card processor 110 transmits the captured swipe data to the card issuer 112 for authorization. If approved, the authorization is returned to the virtual terminal 105 on the transaction computer 102 and the transactions are completed.

Once the first transaction and the second transaction are completed, the card processor 110 may also settle transactions with a merchant bank 114. That is, the card processor 110 may deposit funds received from the card issuer 112 into a first merchant account 116 and a second merchant account 118 of the merchant bank 114. In this regard, the first merchant account 116 may be designated to receive the funds from the first transaction and the second merchant account 118 may be designated to receive funds from the second transaction.

Figure 2:
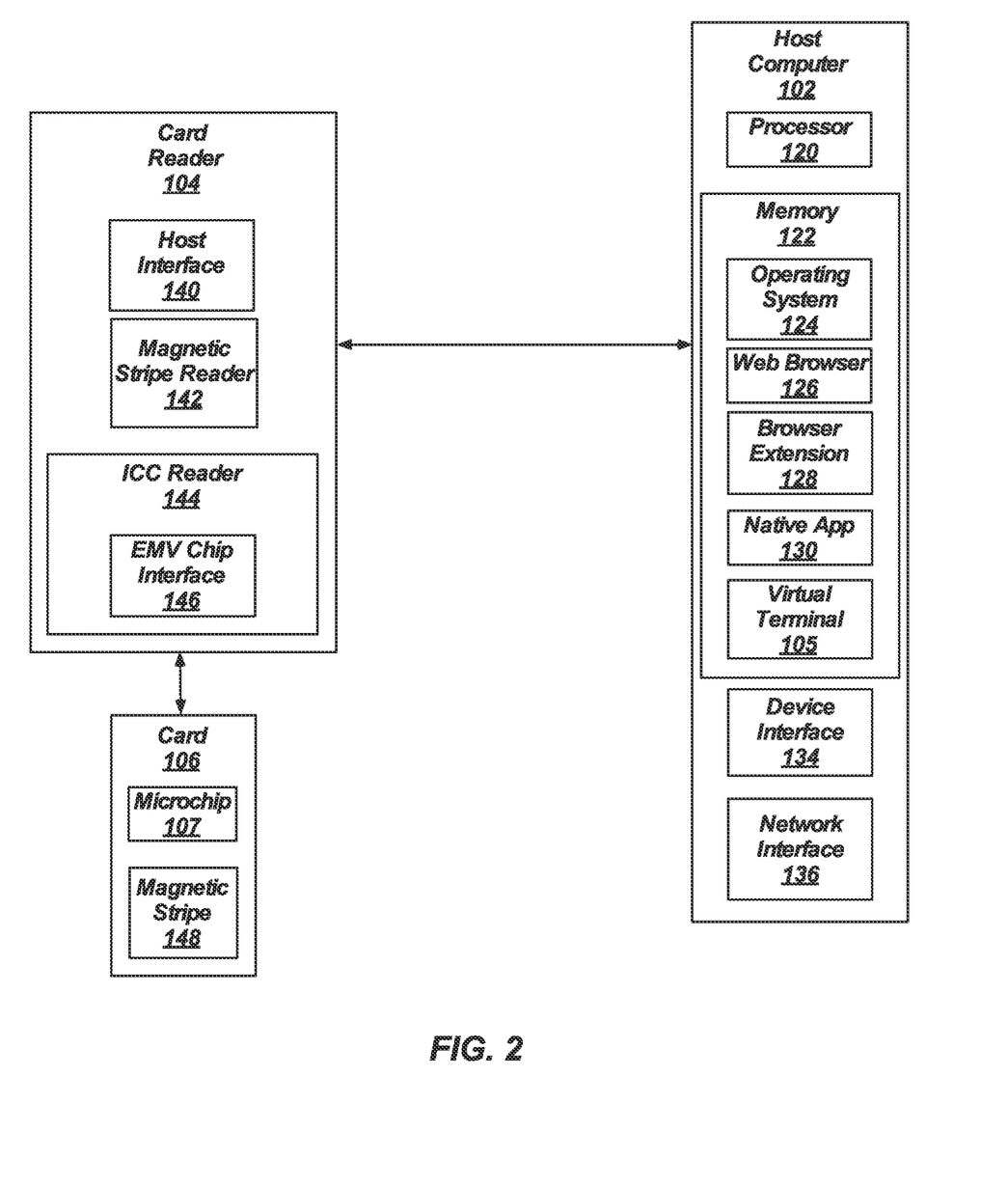
FIG. 2 is a block diagram showing the components of a transaction computer and card reader configured to complete two transactions via a single insertion of a chip card into a slot of the card reader.

Referring to FIG. 2, there are depicted the components of the transaction computer 102 and the card reader 104. The transaction computer 102 may comprise a processor 120 and a computer memory 122. The processor 120 may be a microprocessor suitable for use in computing devices. The computer memory 122 is connected to the processor 120 and may be RAM or ROM. Stored in the computer memory 122 may be computer programs, including an operating system 124, a web browser 126, a browser extension 128, a native application 130, and the virtual terminal 105.

The operating system 124 may be any suitable operating system for computing devices, including variants of the Windows, OS X, Linux, Android, and iOS operating systems. The web browser 126 may be any suitable web browser for accessing online content, including Firefox, Chrome, Internet Explorer, Safari, and Edge browsers. The browser extension 128 may be a small software module for customizing the web browser 126 as will be explained in more detail hereinafter. The native application 130 is a software program developed for use on the transaction computer 102. The virtual terminal 105 is a browser-based application may be retrieved from online computer servers operated by the card processor 110.

The device interface 134 may include ports for attaching external devices, including the card reader 104, to the transaction computer 102. The device interface 132 may include a USB port. The network interface 136 connects the transaction computer 102 to the network 109 (see FIG. 1) to facilitate communications with the computer servers of the card processor 110 (not shown).

The card reader 104 includes a host interface 140, a magnetic stripe reader 142, and an integrated circuit card (ICC) reader 144. The host interface 140 allows the card reader 104 to connect to the transaction computer 102 over a wired or wireless connection. The host interface 140 may include a USB port. The magnetic stripe reader 142 allows the card reader 104 to retrieve swipe data from magnetic stripes on chip cards. The ICC reader 144 can interface with the microchip 107 on the chip card 106 using either a contact or contactless interface. The ICC reader 144 may include an EMV chip interface 146 for interfacing with chip cards pursuant to the EMV standard. The ICC reader 144 may comply with ISO/IEC 7816, which defines the transmission protocol between chip cards and readers. The ICC reader 144 may also comply with ISO/IEC 14443, which defines the transmission protocol between chip cards and readers for contactless cards.

In an embodiment, the microchip 107 of the chip card 106 operates pursuant to the EMV standard. And, as discussed above, the microchip 107 is operable to generate a one-time code, known as a cryptogram, for each transaction. Further, as explained above, the microchip 107 is able to generate a one-time code for a first transaction and a one-time code for a second transaction without being removed from the card reader 104. The chip card 106 further includes a magnetic stripe 148 for conventional magnetic swipe transactions.

Figure 3:
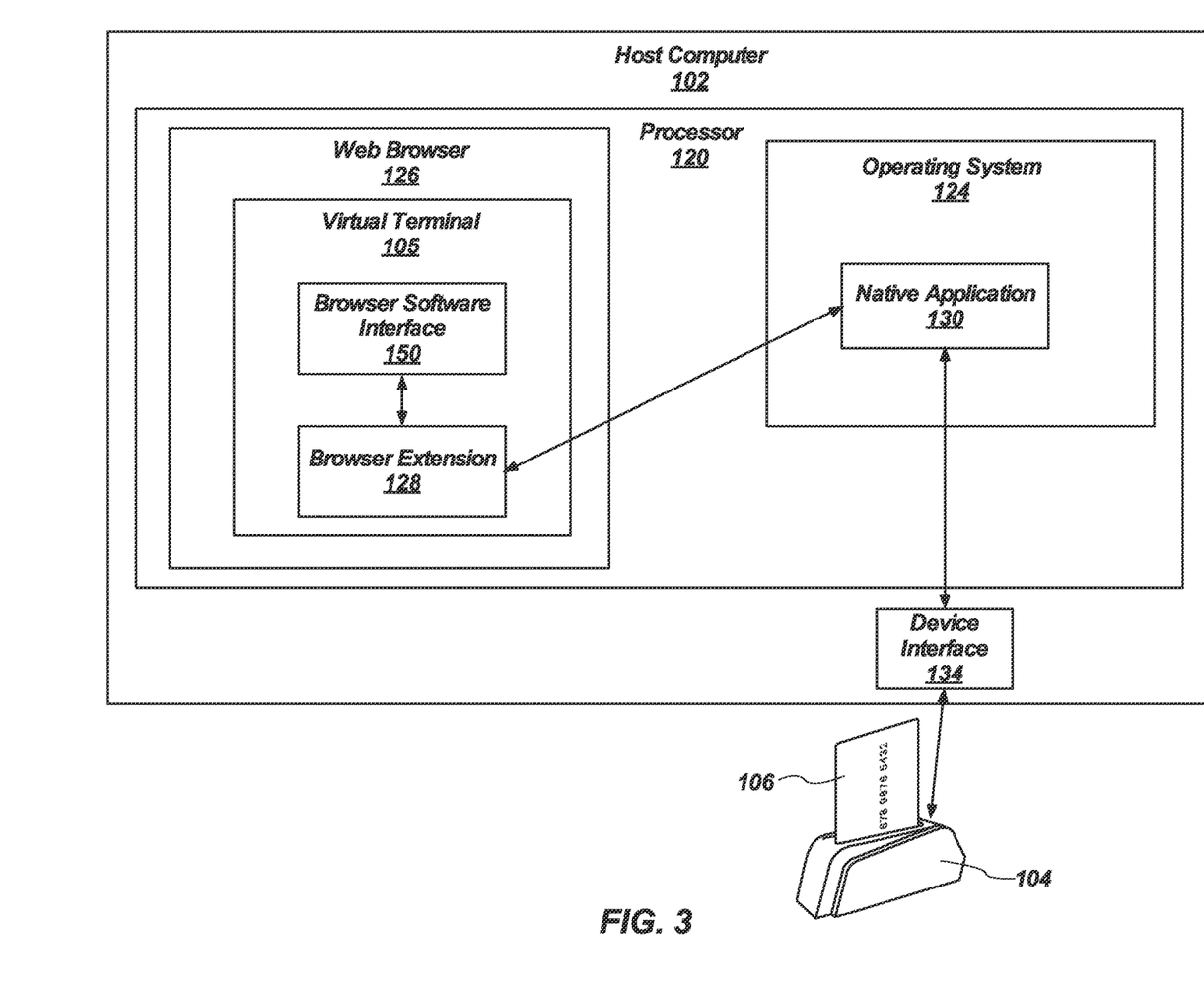
FIG. 3 is a block diagram of the transaction computer connected to the card reader.

Referring to FIG. 3, the operations of the programs as executed by the processor 120 the transaction computer 102 are described in more detail in relation to performing multiple chip card transactions with a single insert of the chip card 106 into the card reader 104. As discussed above, the virtual terminal 105 is a browser-based application retrieved from the computer servers of the card processor 110 (see FIG. 1). The virtual terminal 105 includes an in-browser software interface 150 that sends commands and receive responses to either the browser extension 128 or to an internal browser USB interface, if available and supported.

The in-browser software interface 150 runs in the web browser 126 and performs the bulk of the communication logic. The in-browser software interface 150 is configured with a customized configuration from computer servers hosted by the card processor 110. The merchant 108 enters the transaction details and applicable fees are computed.

Figure 4:
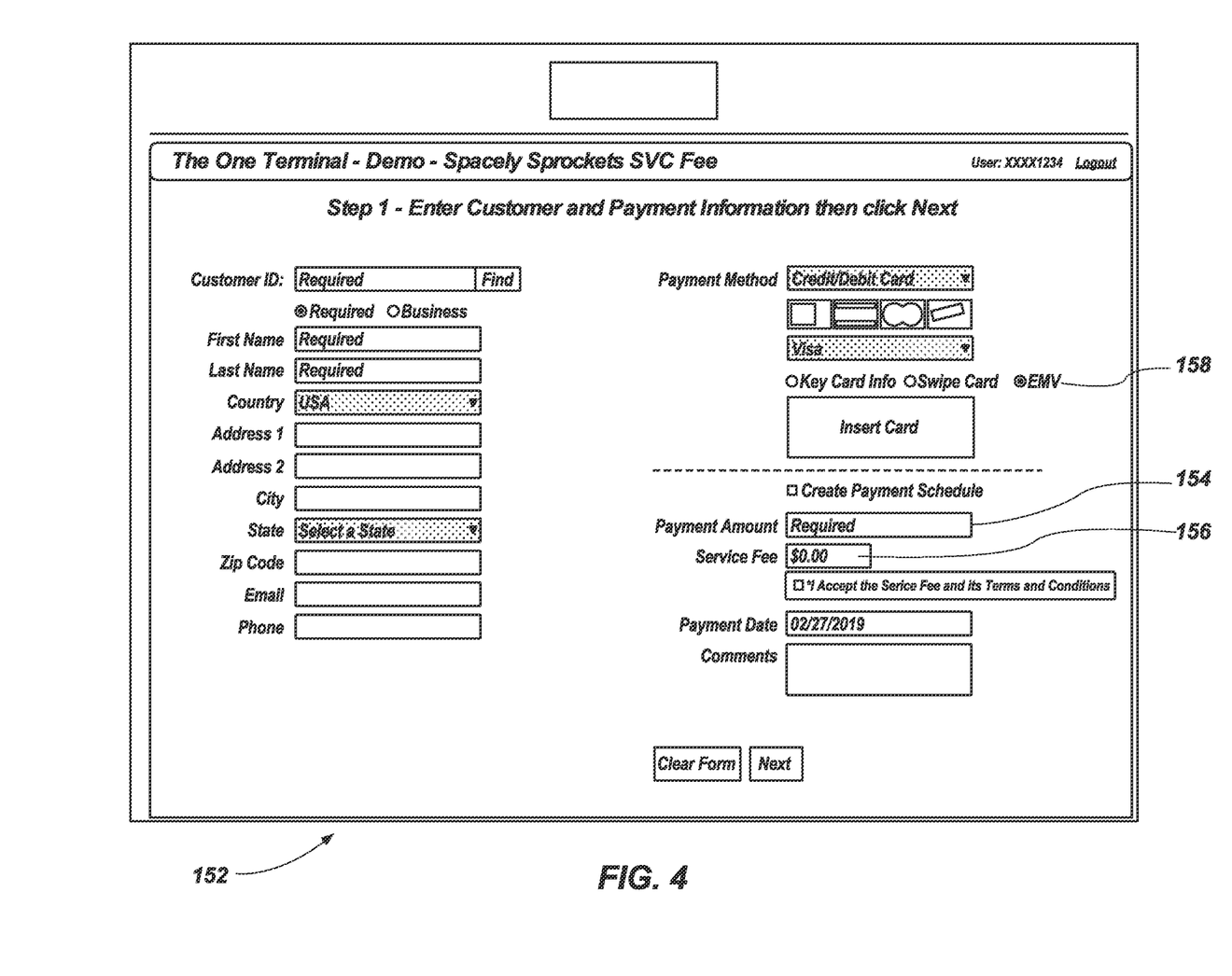
FIG. 4 is an exemplary web page of a virtual card terminal with data entry boxes for defining a first transaction and a second transaction to be completed during a single insertion of a chip card into.

An exemplary web page 152 of the virtual terminal 105 is shown in FIG. 4. The web page 152 may include text input boxes for entering customer information. In addition, the web page 152 may include a text input box for entering a first transaction amount 154 and a text box 156 for displaying a second transaction amount. The web page 152 may further include check boxes 158 for selecting one of the following type of transactions: EMV, swipe card, or manual input.

If the transaction is an EMV transaction, the in-browser software interface 150 probes to detect insertion of the chip card 106 into the card reader 104. If the chip card 106 is inserted, the in-browser software interface 150 initiates the Start, Authenticate, Complete/Cancel, and Retrieve commands to the chip card 106 for the first transaction. If the transaction requires a separate fee, the interface 150 performs the same Start, Authenticate, Complete/Cancel, and Retrieve commands for the separate fee for the second transaction.

When all the details for the first transaction and the second transaction are complete and the chip card 106 has been read for the appropriate number of times, the interface 150 confirms and then sends the one-time codes for the transactions to the card processor 110 and the card issuer 112 for authentication and approval. If the transaction is a swipe-based transaction, the interface 150 prompts the user for swipe and then prepares for a read. Unlike traditional card readers that use keyboard emulation, the merchant is able to use the keyboard or have focus outside the card reader 104 during the swipe without risking losing swipe data.

The browser extension 128 interfaces with the in-browser software interface 150 and bi-directionally translates via native messaging to the native application 130. The browser extension 128 runs under a different permission set than the interface 150 and the virtual terminal 105. The browser extension 128 initiates a connection to the native application 130, if present, and probes the hardware, i.e. the card reader 104, via the native application 130. (If a merchant is configured to use a supported card reader 104 but no browser extension or native application is detected, then the virtual terminal 105 will display instructions or links on how to download the browser extension 128 and the native application 130 if either is missing, prompt for hardware plugin if it is not plugged in, or proceed normally if all components are installed and operating.) The browser extension 128 listens for messages from the in-browser software interface 150 and keeps track of the messages sent to the native application 130 so that if a matching message is returned it is sent to the correct handler.

The native application 130 includes a native message translation layer which registers as a native messaging host for the browser extension 128 to connect and translate the messages to or from the device interface 134 and the browser extension 128. The term "native" refers to running as a compiled application or driver interfacing with the host operating system 124 and hardware. The native application 130 runs on the transaction computer 102 hosting the USB port at the point of sale.

The native message translation layer of the native application 130 is a native multithreaded application that connects to the underlying host operating system 124 USB or HID layer. This layer is able to discover and connect to compatible USB or HID devices plugged into the transaction computer 102 at the point of sale. This layer receives messages from the connected browser extension 128, relays the message to the USB/HID communication thread which interprets the message and then sends it to the card reader 104. Any messages or responses from the card reader 104 are analyzed and possibly matched with requests before encapsulating and sending the message to the browser extension 128.

The virtual terminal 105 discovers and initiates a connection to the card reader 104. From this point, the card reader 104 may be reconfigured and initialized. Depending upon the desired mode of the card reader 104, the virtual terminal 105 may signal the card reader 104 to prepare for a card insert or prepare for a swipe. If an EMV transaction is initiated, then the card reader 104 must be directed or commanded to perform each step of the EMV transaction set (typically Start, Authenticate, Complete/Cancel, and Retrieve) for each desired transaction in a multi-transaction.

As part of the authentication step, the card reader 104 requests that the chip card 106 generate a one-time code, i.e., a cryptogram, for each transaction. For an online EMV transaction, the one-time code is referred to as Authorization Request Cryptogram (ARQC). The ARQC is sent in an authorization request to the card issuer 112 by the card processor 110. The ARQC created by the chip card 106 is a digital signature of the transaction details, which the card issuer 112 can authenticate in real time. It will be appreciated that the ARQC provides a strong cryptographic check that the chip card 106 is genuine. The card issuer 112 responds to a request for authentication with a response code (accepting or declining the transaction) and an authorization response cryptogram (ARPC). Thus, for each transaction, the virtual terminal 105 receives an ARPC from the card issuer 112 in an online transaction. For offline transactions, the one-time code is referred to as a Transaction certificate (TC).

Alternatively, the card reader 104 may operate in a Quick Chip mode where no ARPC is received from the card issuer 112. (The Quick Chip mode allows for early removal of the chip card from the terminal, while relying on standard EMV processing between the card and terminal. It removes the need for EMV processing to wait for the final transaction amount, authorization response, and post-authorization processing (such as script processing and issuer authentication).

If a swipe is initiated, then the card reader 104 is set to read and then the capture is sent upstream to the virtual terminal 105. In the process of prompting for and completing a transaction, the virtual terminal 105 may issue commands to the card reader 104 to light or flash LEDs and/or make sounds to prompt the cardholder to action.

Figure 5:
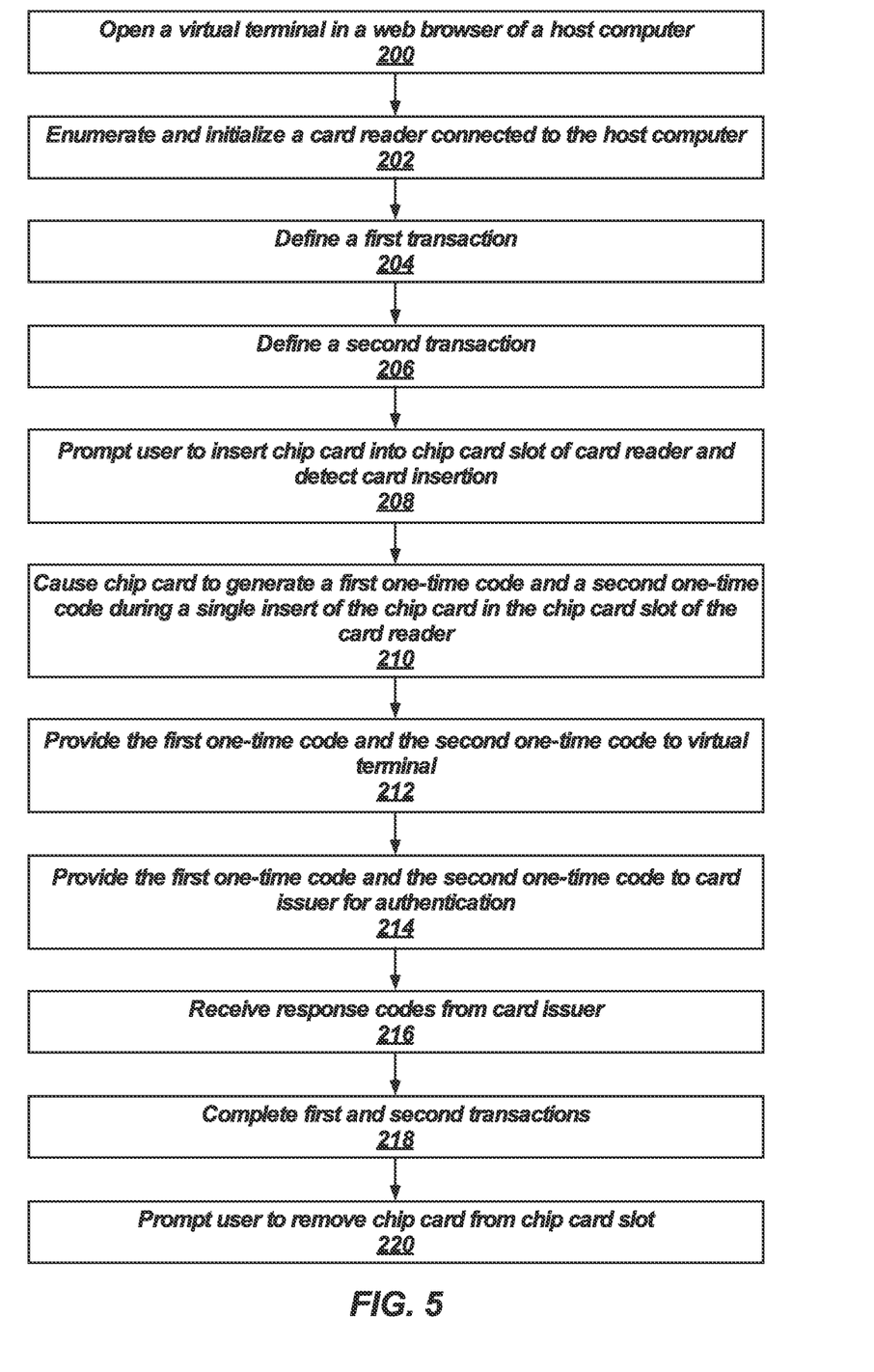
FIG. 5 is a flow diagram of a process for interfacing with a chip card from a card reader and a transaction computer.

Referring now to FIG. 5, a process of performing multiple transaction during a single insert of the chip card 106 using the system 100 as shown in FIGS. 1-4. At step 200, a user opens the web browser 126 on the transaction computer 102 and retrieves the virtual terminal 105, a browser-based application, from an online computer server hosted by the card processor 110. The user may enter in a login ID and password to access and enable the features of the virtual terminal 105. At step 202, the virtual terminal 105, running in the web browser 126 of the transaction computer 102, enumerates the card reader 104. At step 202, the virtual terminal 105 also may initialize the card reader 104. At step 204, the user defines a first transaction through the virtual terminal 105. The first transaction defined by the user may include a first transaction amount. For example, the user may manually type the first transaction amount in a text box of a web page provided by the virtual terminal 105. The virtual terminal 105 may include click boxes for determining the first transaction amount.

At step 206, a second transaction is defined by the virtual terminal 105. The second transaction may include a second transaction amount. The virtual terminal 105 may automatically define the second transaction amount based upon the first transaction amount. For example, the second transaction amount may be a percentage of the first transaction amount. The second transaction amount may be sufficient to cover all of the transaction fees associated with the first transaction and the second transaction. The second transaction amount may be a fixed amount, such as a convenience fee. Alternatively, the user may define the second transaction amount using the virtual terminal 105. For example, the user may type in the second transaction amount in a text box of a web page provided by the virtual terminal 105.

At step 208, the card holder is prompted to insert the chip card 106 into the slot 104A of the card reader 104. The card reader 104 may initiate communications with the microchip 107 of the chip card 106. At step 210, the virtual terminal 105 causes the microchip 107 on the chip card 106 to generate a first one-time code associated with the first transaction and a second one-time code associated with the second transaction—all while the chip card 106 remains inserted in the slot 104A of the card reader 104. To be clear, the user need not remove the chip card 106 from the slot 104A between the generation of the first one-time code and the second one-time code. The first one-time code and the second one-time code may be cryptograms. It will be appreciated that the chip card 106 and the card reader 104 may be compliant with the EMV standard.

At step 212, the first one-time code and the second one-time code are provided to the virtual terminal 105. At step 214, the virtual terminal 105 sends the first one-time code and the second one-time code to the card issuer 112 of the chip card 106 for authentication and approval of the first transaction and the second transaction. It will be appreciated that the first one-time code and the second one-time code may be sent to the card processor 110 who will then route the first one-time code and the second one-time code to the card issuer 112 for authentication and approval.

At step 216, the virtual terminal 105 receives a first response code associated with the first transaction and a second response code associated with the second transaction that were generated by the card issuer 112. It will be appreciated that the first response code and the second response code may be routed through the card processor 110 to the virtual terminal 105.

At step 218, if the first response code and the second response code authorize and/or authenticate the first transaction and the second transaction, respectively, the virtual terminal 105 completes the first transaction and the second transaction. At step 220, the user is prompted to remove the chip card 106 from the slot 104A of the card reader 104.

Figure 6:
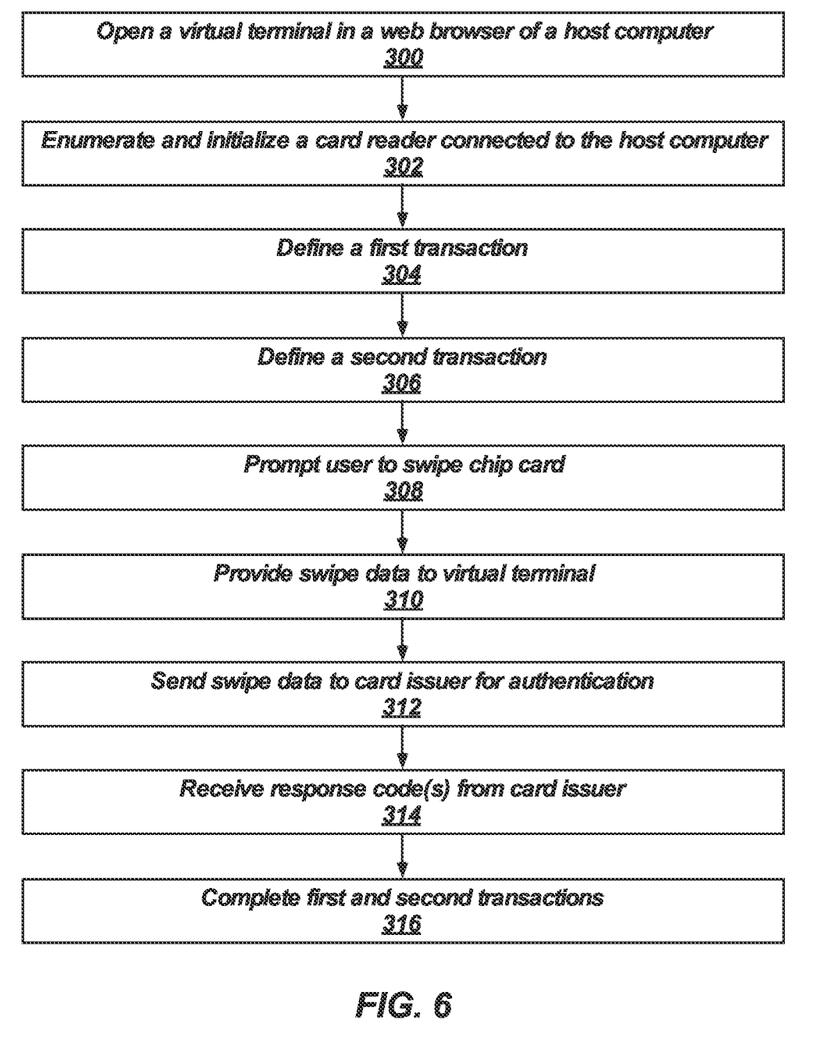
FIG. 6 is a flow diagram of a process for interfacing with a magnetic stripe of a chip card from a card reader and a transaction computer.

Referring now to FIG. 6, a process of performing multiple transaction using a single swipe of the chip card 106 using the system 100 as shown in FIGS. 1-4. At step 300, a user opens the web browser 126 on the transaction computer 102 and retrieves the virtual terminal 105, a browser-based application, from an online computer server hosed by the card processor 110. The user may enter in a login ID and password to access the features of the virtual terminal 105. At step 302, the virtual terminal 105, running in the web browser 126 of the transaction computer 102, enumerates the card reader 104. The virtual terminal 105 also may open and configure the card reader 104. At step 304, the user defines a first transaction through the virtual terminal 105. The first transaction defined by the user may include a first transaction amount. For example, the user may manually type the first transaction amount in a text box provided by the virtual terminal 105. The virtual terminal 105 may include click boxes for determining the first transaction amount.

At step 306, a second transaction is defined by the virtual terminal 105. The second transaction may include a second transaction amount. The virtual terminal 105 may automatically define the second transaction amount based upon the first transaction amount. For example, the second transaction amount may be a percentage of the first transaction amount. The second transaction amount may be sufficient to cover all of the processing fees associated with the first transaction and the second transaction. The second transaction amount may be a fixed amount, such as a convenience fee. Alternatively, the user may define the second transaction amount using the virtual terminal 105. For example, the user may type in the second transaction amount in a text box provided by the virtual terminal.

At step 308, the card holder is prompted to swipe the chip card 106 into the magnetic stripe reader 104B of the card reader 104. The card reader 104 extracts the swipe data from the magnetic stripe 148 of the chip card 106 as it is swiped. At step 310, the swipe data is provided to the virtual terminal 105. At step 312, the virtual terminal 105 sends the swipe data to the card issuer 112 of the chip card 106 for authentication and approval of the first transaction and the second transaction. It will be appreciated that the swipe data may be sent to the card processor 110 who will then route the swipe data to the card issuer 112 for authentication and approval.

At step 314, the virtual terminal 105 receives a first response code associated with the first transaction and a second response code associated with the second transaction that were generated by the card issuer 112. Alternatively, the virtual terminal 105 may only receive a single response code for both the first transaction and the second transaction. It will be appreciated that the first response code and the second response code may be routed through the card processor 110.

At step 316, if the first response code and the second response code authorize and/or authenticate the first transaction and the second transaction, respectively, the virtual terminal 105 completes the first transaction and the second transaction using the swipe data.

Figure 7:
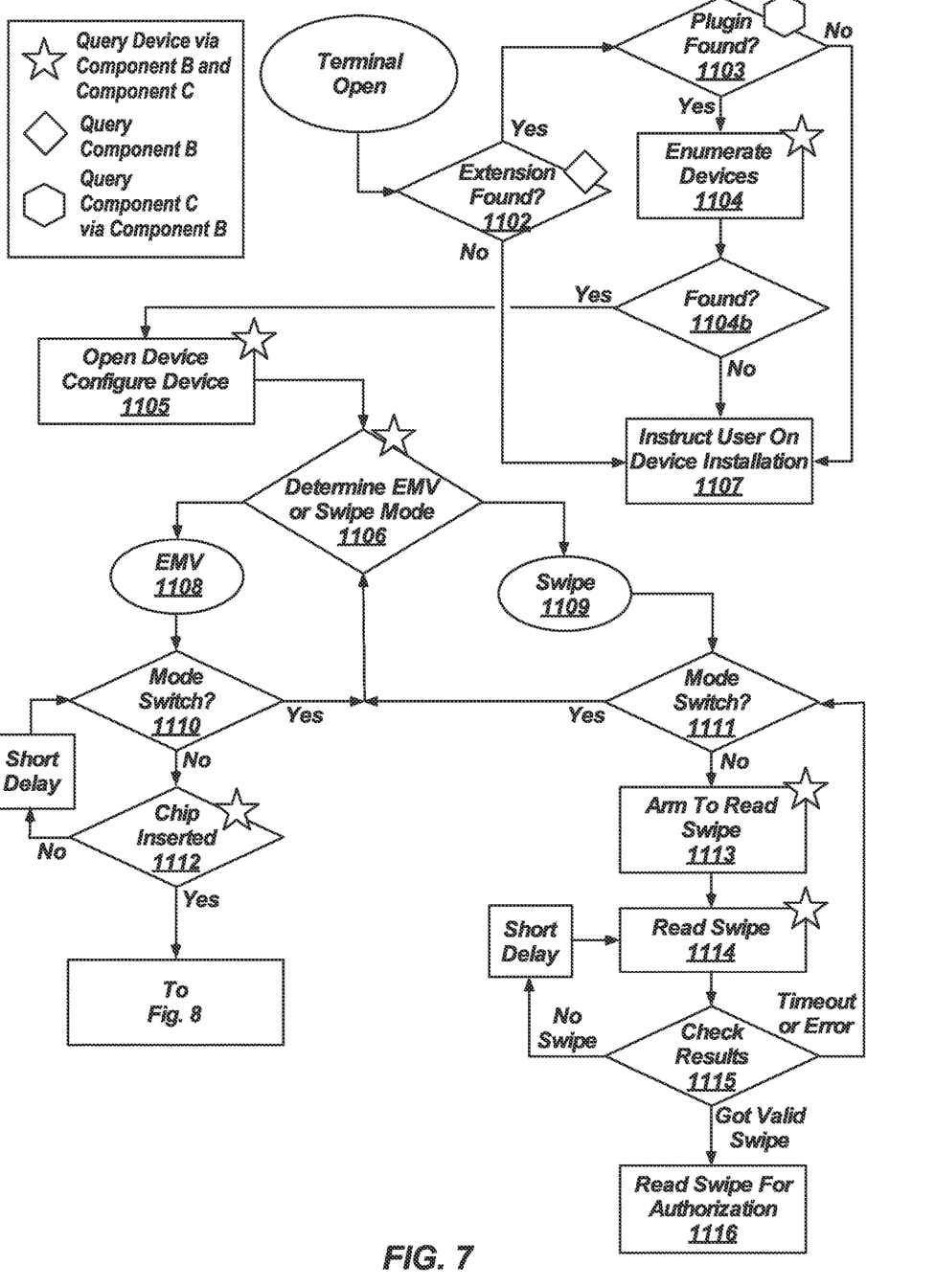
FIGS. 7 and 8 is a flow diagram of a process for interfacing with a chip card from a card reader and a transaction computer.
Figure 8:
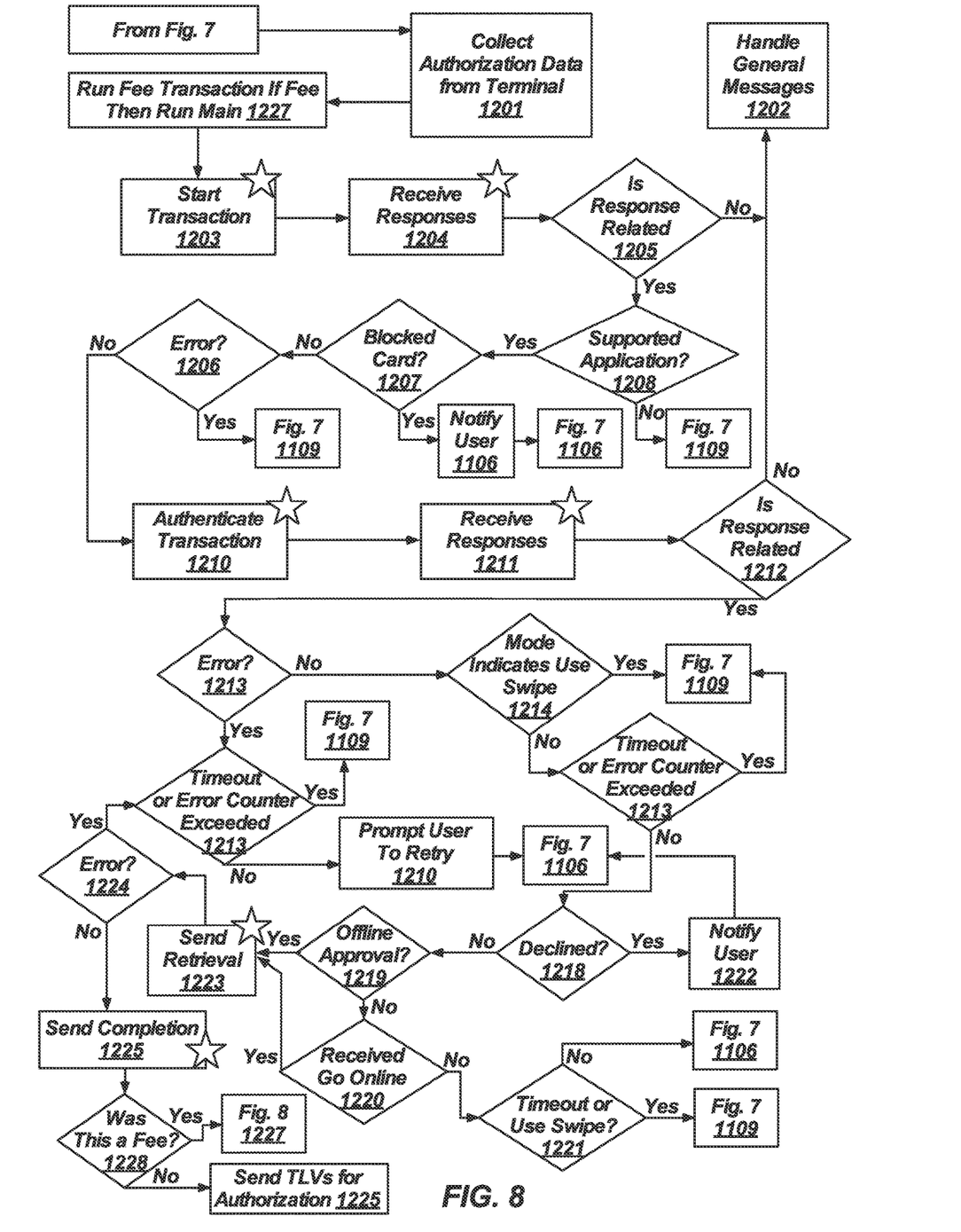

FIGS. 7 and 8 depict a flow diagram for processing multiple transactions with a single EMV card dip or a swipe with reference to FIGS. 1-4. At step 1101, the in-browser software interface 150 opens and begins initializing. At step 1102, the interface 150 checks for the presence of the browser extension 128. At step 1103, the interface 150 checks for the presence of the native application 130. At step 1104, the card reader 104 is enumerated on the transaction computer 102 at the request of the interface 150. At step 1104B, the interface 150 receives a list of compatible devices and also checks if the card reader 104 is acceptable.

At step 1105, the interface 150 opens the card reader 104. After the card reader 104 is open, the interface 150 sends a series of commands to enable the LEDs, enable the beeper, update the configuration (Send a set of TLV data with a default config), set the date on the device, and flash the led to indicate the device is ready. At step 1106, the interface 150 checks if the card reader 104 is in EMV or Swipe Mode. At step 1107A, the interface 150, a modal message is displayed on how to install the browser extension 128 (if not installed), the native application 130 (if not detected) and instructs to plug in the card reader 104 (if not detected).

At step 1108, the mode is set for EMV in the interface 150. At step 1109, the mode is set for swipe in the interface 150. At step 1110, the interface 150 checks to see if the mode has changed from EMV. At step 1111, the interface 150 checks to see if the mode has changed from swipe. At step 1112, the interface 150 queries the card reader 104 to see if an EMV card has been inserted into the slot 104A of the card reader 104. At step 1113, the interface 150 asks the card reader 104 to prepare for a card swipe. At step 1114, the interface 150 asks the device for swipe data. At step 1115, the interface 150 determines if the wipe data was returned and valid. At step 1116, the interface 150 makes a request through the gateway or processor to request for authorization of the swipe.

At step 1201, the interface collects data from the card terminal such as the authorization amount to prepare for a chip request. At step 1202, the native application 130 receives periodic messages from the card reader 104. The messages are relayed to the interface 150. If a handler is present, the handler takes care of the message. If no handler is present, a generic handler handles the message which is just logged unless it is a request to display a message to the user.

At step 1203, the interface 150 sends a Start Transaction request to the card reader 104. At step 1204, the interface 150 receives responses from the card reader 104. At step 1205, the interface 150 checks a received response to see if it is related to a previous request or command. At step 1206, the interface 150 checks for an error condition. At step 1207, the interface 150 checks if a blocked card response was received. At step 1208, the interface 150 checks if the EMV application embedded on the chip is a supported application. At step 1209, the interface 150 displays a notification message to the user.

At step 1210, the interface 150 sends a Authenticate Transaction request to card reader 104. At step 1211, the interface 150 receives responses from the card reader 104. At step 1212, the interface 150 checks a received response to see if it is related to a previous request or command. At step 1213, the interface 150 checks for an error condition. At step 1214, the interface 150 checks to see if the response message or condition indicates we should use a swipe transaction instead of an EMV chip read.

At 1215, the interface 150 checks if the error limit is exceeded or is otherwise considered a hard failure for this chip. At step 1216, the interface 150 prompts the user to retry. At step 1217, the interface 150 checks if the error limit is exceeded or is otherwise considered a hard failure for this chip. At step 1218, the interface 150 checks to see if the response is a decline condition. At step 1219, the interface 150 checks to see if the response is an offline approval. At step 1220, the interface 150 checks to see if the response is an "go online" recommendation. At step 1221, the interface 150 checks if the error limit is exceeded or is given a recommendation to swipe card. At step 1222, the interface notifies the user of the decline. At step 1223, the interface 150 sends a Retrieval Request to the card reader 104. At step 1224, the interface 150 checks to see if the response is an error response. At step 1225, the interface 150 sends a Completion Request to the card reader 104.

At step 1226, the interface 150 makes requests through the gateway or processor to request for authorization of the EMV TLV data. If it is a fee transaction, the fee is submitted first and then if that approves the main transaction is ran. If it is not a fee transaction, then just the main transaction is run. The fee transaction contains a different cryptogram than the main as they are separately run on the chip.

At step 1227, the interface 150 checks if there is a fee for this transaction, if so, it selects the information for the fee using the fee merchant mid and account to run first then, if it is successful, of if there is no fee, it runs a second transaction with the main amount merchant mid and account. At step 1228, runs the main transaction after the fee transaction, otherwise it only runs the main transaction.

The present disclosure further comprises a non-transitory computer-readable medium including computer-readable instructions that are configured to cause a host computer to interface with an EMV chip card inserted into a slot of an EMV chip card reader by performing a method comprising: initializing an EMV card reader; defining a first transaction; defining a second transaction; and causing the embedded microchip of the EMV chip card to generate a first cryptogram associated with the first transaction and a second cryptogram associated with the second transaction during a single insertion of the EMV chip card into the chip card slot of the EMV card reader (contact interface) or a single tap of the chip card (contactless interface). The non-transitory computer-readable medium may further include a method for defining the second transaction based upon the first transaction. The non-transitory computer-readable may further include a method for configuring the host computer to provide a virtual terminal for EMV transactions. The non-transitory computer-readable medium may further include a method for authenticating the first cryptogram and the second cryptogram during the single insertion of the EMV chip card into the chip card slot of the EMV card reader. The non-transitory computer-readable medium may further include a method for defining a first transaction amount for the first transaction based upon user input and defining a second transaction amount for the second transaction based upon the first transaction amount.

The term "computer-readable medium" as used herein refers to any medium that participates in providing instructions to the processor for execution. A computer-readable medium may take many forms, including but not limited to, flash media of various type, non-volatile media, and volatile media. Non-volatile media includes, for example, optical, magnetic disks, and magneto-optical disks, such as the hard disk or the removable media drive. Volatile media includes dynamic memory, such as the main memory.

It will be appreciated that the present disclosure provides a solution that greatly streamlines the "service fee" processing process as this payment model requires two and separate transactions to be processed. The virtual terminal is capable of generating the required two transactions via a single EMV dip and is fully integratable with chip card readers and swipe readers.

The foregoing description has been presented for purposes of illustration and description. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A method comprising:
   probing, by a native application installed on a computer, hardware of a chip card reader;
   providing a prompt requesting insertion of a chip card into the chip card reader;
   detecting insertion of the chip card in the chip card reader;
   in response to detecting the insertion of the chip card, establishing a single interface session between the chip card reader and an embedded microchip of the chip card;
   instructing the embedded microchip to generate a first cryptogram and a second cryptogram;
   receiving, via the chip card reader, the first cryptogram and the second cryptogram generated by the embedded microchip of the chip card; and
   transmitting each of the first cryptogram and the second cryptogram to a card processor to authenticate each of the first cryptogram and the second cryptogram in association with the single interface session between the chip card reader and the embedded microchip of the chip card;
   wherein the native application enables bidirectional communication between the chip card reader and a virtual terminal executed by a server.

2. The method of claim 1, wherein the native application is a software program installed on the computer that interfaces with an operating system of the computer;
   wherein the virtual terminal is accessible by way of a network browser installed on the computer; and wherein the virtual terminal is executed by the server that is located remote to the computer and the chip card reader.

3. The method of claim 2, wherein the native application comprises a native message translation layer that registers as a native messaging host for the virtual terminal to translate messages between the chip card reader and the virtual terminal.

4. The method of claim 3, wherein the native message translation layer communicates with a human interface device (HID) layer of the operating system of the computer, and wherein the HID layer discovers and connects to the chip card reader.

5. The method of claim 1, wherein the native application comprises a native message translation layer that translates messages received from the virtual terminal to a format readable by the chip card reader.

6. The method of claim 1, wherein the native application communicates with the virtual terminal by way of a network browser extension installed on the computer.

7. The method of claim 1, wherein the native application comprises a native message translation layer that discovers and communicates with the chip card reader via a human interface device (HID) layer of the computer; and
wherein the method further comprises the native message translation layer encapsulating messages received from the chip card reader to generate an encapsulated message prior to providing the encapsulated message to the virtual terminal by way of a network browser extension installed on the computer.

8. The method of claim 1, wherein the method further comprises:
providing the first cryptogram and the second cryptogram to the virtual terminal by way of a network browser extension installed on the computer;
receiving approval from the card processor to process a first transaction associated with the first cryptogram; and
receiving approval from the card processor to process a second transaction associated with the second cryptogram;
wherein each of the first transaction and the second transaction is associated with the single interface session between the chip card reader and the embedded microchip of the chip card.

9. The method of claim 1, wherein the virtual terminal comprises software configured to communicate with one or more of a card processor or a card issuer by way of a network;
wherein the virtual terminal enables a first transaction associated with the first cryptogram, and a second transaction associated with the second cryptogram, to each be processed during the single interface session between the chip card reader and the embedded microchip of the chip card;
wherein the first transaction and the second transaction are associated with different transaction amounts; and
wherein the first cryptogram is different from the second cryptogram.

10. The method of claim 1, wherein probing, by the native application installed on the computer, the hardware of the chip card reader comprises the virtual terminal communicating with the native application by way of a network browser extension installed on the computer.

11. The method of claim 1, wherein establishing the single interface session between the chip card reader and the embedded microchip of the chip card comprises the virtual terminal defining a first transaction and a second transaction to each be processed in association with the single interface session.

12. The method of claim 1, further comprising:
the virtual terminal receiving a user input to initiate a transaction by way of a network browser installed on the computer;
the virtual terminal determining whether the native application is installed on the computer; and
the virtual terminal determining whether a network browser extension is installed on the computer.

13. The method of claim 1, wherein a network browser extension is installed on the computer;
wherein the virtual terminal communicates with the native application by way of the network browser extension; and
wherein the native application comprises a native message translation layer that registers as a native messaging host for the network browser extension to connect and translate messages between the chip card reader and the virtual terminal.

14. The method of claim 13, wherein the native message translation layer is a multithreaded application that connects to an underlying host operating system human interface device (HID) layer installed on the computer, and wherein the HID layer discovers and connects to the chip card reader when the chip card reader is plugged into an external interface on the computer.

15. The method of claim 1, further comprising the virtual terminal signaling the chip card reader to prepare for one or more of an insert or a tap of the chip card.

16. The method of claim 1, wherein the first cryptogram is an authorization request cryptogram (ARQC) associated with a first transaction;
wherein the second cryptogram is an ARQC associated with a second transaction;
wherein each of the first transaction and the second transaction are processed during the single interface session; and
wherein the virtual terminal provides the first cryptogram and the second cryptogram to a card issuer of the chip card to authenticate the first transaction and the second transaction in real-time.

17. The method of claim 16, further comprising receiving, by the virtual terminal, an authorization response from the card issuer indicating whether to process the first transaction and the second transaction.

18. The method of claim 16, further comprising:
receiving, by the virtual terminal, a first response code from the card issuer that authenticates the first transaction;
receiving, by the virtual terminal, a second response code from the card issuer that authenticates the second transaction;
processing, by the virtual terminal, each of the first transaction and the second transaction in response to receiving each of the first response code and the second response code.

19. The method of claim 1, wherein the native application comprises a native application translation layer that translates
messages to be transmitted to the chip card reader by way of a communication thread for a human interface device (HID) layer of the computer.

20. The method of claim 1, wherein a communication thread for a human interface device (HID) layer of the computer receives messages from each of the chip card reader and the native application; and
    wherein a native message translation layer of the native application translates messages to or from a device interface of the chip card reader to enable the bidirectional communication between the chip card reader and the virtual terminal.

* * * * *